March 4, 1941.  B. MILLER  2,234,128
ANALYSIS OF GAS
Filed Nov. 25, 1938
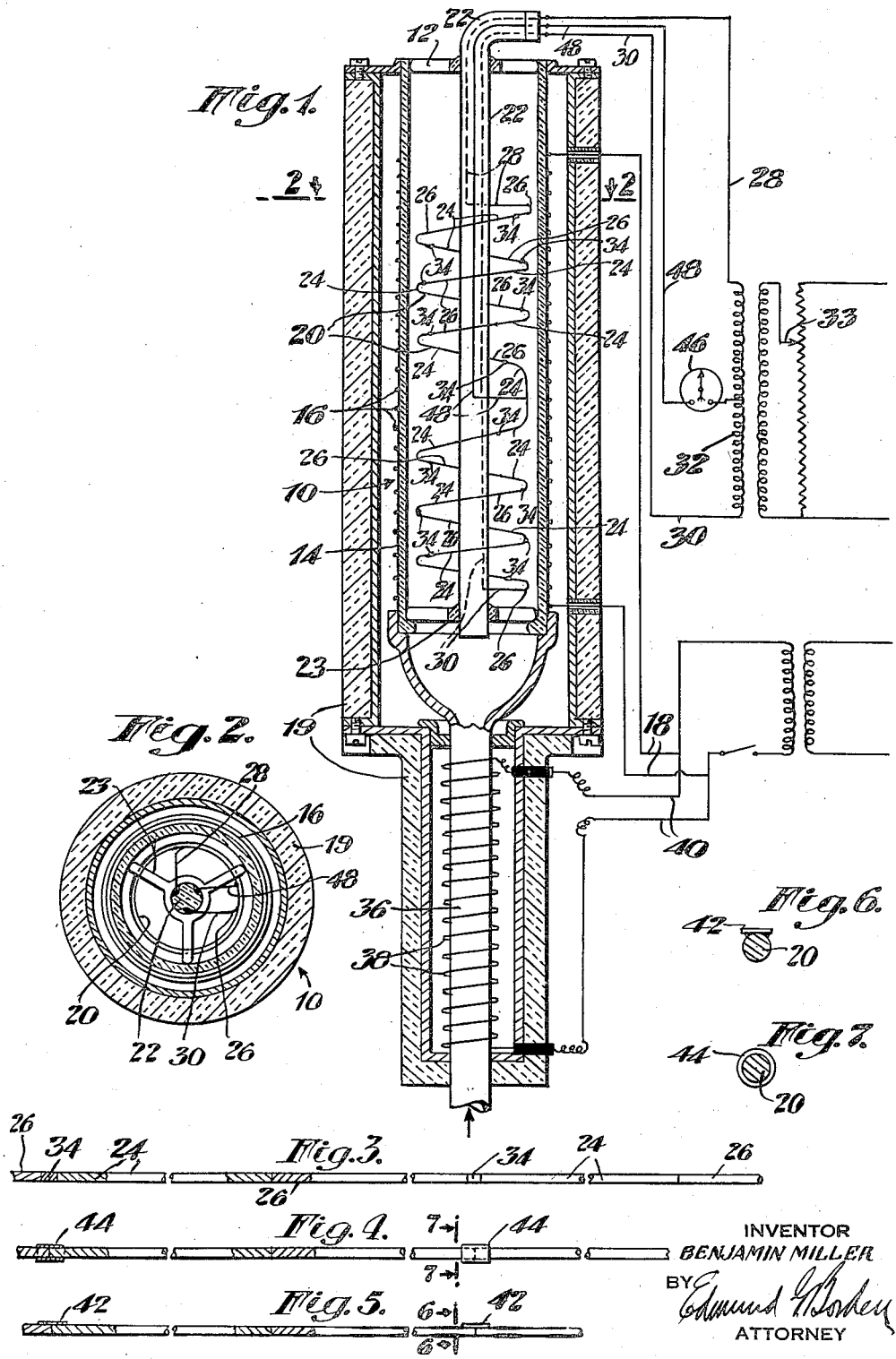
INVENTOR
BENJAMIN MILLER
BY
ATTORNEY Patented Mar. 4, 1941

2,234,128

UNITED STATES PATENT OFFICE 2,234,128

ANALYSIS OF GAS

Benjamin Miller, Richmond Hill, N. Y., assignor to Cities Service Oil Company, New York, N. Y., a corporation of Pennsylvania Application November 25, 1938, Serial No. 242,189

9 Claims. (Cl. 23—232)

The present invention relates to the analysis of gases and is particularly concerned with quantitative determination of combustible components of gas-air mixtures. The invention is more specifically directed to the problem of analyzing atmospheres such as garage, mine and vehicular tunnel atmospheres to determine the amount of carbon monoxide or other combustible gaseous constituents in such atmospheres. It will be appreciated that the presence of even a few hundredths of one per cent of carbon monoxide in an atmosphere may create a health hazard, and that the detection of this hazard requires the use of gas analyzing methods and apparatus which are very sensitive and dependable.

It is accordingly a primary object of the invention to provide improved methods and means adapted for making continuous accurate quantitative determinations of very small amounts of combustible gas in air.

Catalytic means are employed for initiating combustion reactions in accordance with the present invention, such catalytic reactions forming the basis of determinations of the presence and amount of a combustible constituent in the gas under analysis. A very short heated wire or ribbon of catalytic metal is the preferred form of catalyst because this form remains active longer and is more easily reactivated as compared to other forms of catalysts of greater surface to volume ratio. The preferred catalyst is a platinum or platinum-alloy wire or ribbon which is heated to a temperature of about 1000° F. Any combustion which is catalyzed by this type and form of catalyst at this temperature is an incomplete and localized reaction which takes place at the surface of the catalyst and which creates at best only a relatively small temperature rise in the catalyst. This temperature rise could of course be measured by means of a Wheatstone bridge having the catalyst wire as one leg. However, a thermocouple is preferably employed for measuring changes in catalyst temperature, thus permitting use of alternating current for heating the catalyst.

In the gas analyzing unit of the present invention the gas-air mixture under examination is conducted in a flowing stream through an enclosed zone or cell where a small portion of the gas contacts the heated catalyst wire surface while simultaneously another portion of the gas contacts an identically heated and mounted non-catalyst wire surface. By means of hot and cold thermocouple junctions differential temperature readings are taken at the catalyst and non-catalyst wire surfaces. By mounting suitably dimensioned catalyst and non-catalyst wire surfaces at spaced points in the same combustion cell, and by electrically heating both catalyst and non-catalyst surfaces to the same temperature (preferably 1000° F.) by the same electric current while such surfaces are bathed by like portions of a single gas stream flowing through the cell, variations in temperatures which may develop at the two surfaces can only result from catalytic combustion of combustible gas constituents at the catalyst surfaces. This is so because variations in temperatures of the catalyst and non-catalyst surfaces as a result of unequal heating or unequal rates of heat loss to surroundings are avoided by this preferred type of differential gas analyzer.

Plain metal wire is used for both the catalyst and non-catalyst surfaces, in preference to a metal having a coating of non-reactive metal or glass as a non-catalyst surface, since such coatings are generally impermanent or physically unstable and possess heat-dissipating properties which cannot be compensated with those of uncoated metal over any wide range of temperatures.

Even with all of the enumerated factors tending to create variations in the temperature of the two wires in a differential gas analyzer taken care of, the difficulty of obtaining accurate readings still increases in inverse proportional relation to the amount of combustible in the gas being analyzed. The reason for this is that the catalyst operates at a high temperature of at least 1000° F., and this operating temperature is varied less and less by combustion of smaller and smaller amounts of combustible at the catalyst surface. On the other hand, the loss of heat from the catalyst element is comparatively constant in rate. Moreover, any differential change in heat loss between two respectively active and inactive wires in a differential analyzer results in a differential temperature change which may be greater than the differential change of temperature resulting from combustion of a small amount of combustible at the surface of the active or catalyst wire. Furthermore the heat differential resulting from combustion is not altogether proportional to the temperature developed at the active element, since the heat loss of the active wire increases with temperature and so much of the heat loss as results from radiation is a function of the fourth powers of the temperatures of the respective catalyst elements and of the enclosures to which they radiate.

It is accordingly an object of the gas analyzing method and apparatus of the present invention to avoid so far as possible the factors discussed above contributing to inaccuracies in previously designed gas analyzing methods and equipment.

With the above and other objects and features in view, the invention consists in the improved method of and apparatus for analyzing gas which is hereinafter described and more particularly defined by the accompanying claims.

In the following description, reference will be made to the attached drawing, in which:

Fig. 1 is a view in vertical section (with parts shown in elevation) of a combustion cell having mounted therein a plurality of series-connected thermocouple junctions arranged in a single A. C. heating current circuit, with a catalyst metal at alternate "hot" junctions.

Fig. 2 is a horizontal sectional view of the apparatus, taken along the line 2—2 of Fig. 1;

Fig. 3 is an enlarged view of a small section of the series-connected alternately active and inactive wire thermocouple junctions employed in the analyzer of Fig. 1;

Fig. 4 is an enlarged view illustrating a modified arrangement of the catalyst as a sleeve coupling at alternate junctions of the thermocouple wire;

Fig. 5 is another enlarged view of a modification of the thermocouple wire in which the catalyst is applied to the hot thermocouple junction as a small flat sheet or plate.

Fig. 6 is a cross-sectional view of the conductor illustrated in Fig. 5, taken along the line 6—6 of Fig. 5; and Fig. 7 is a cross-sectional view of the conductor illustrated in Fig. 4, taken on the line 7—7 of Fig. 4.

Referring to Fig. 1, a continuous stream of air to be analyzed for small traces of combustible such as CO, is drawn or forced into one end of a combustion cell 10, and is reacted as it passes through the cell, after which the gas sample exits from the apparatus to atmosphere through discharge ports 12 located at the other end of the cell 10. Walls 14 of the cell are preferably constructed of glass, and are surrounded by an electric resistance heating coil 16 (hooked up in an electric heating circuit 18), by means of which the cell walls may be heated. Walls 14 are enclosed within a heat insulation casing 19 to reduce heat loss from the cell.

In flowing from end to end of the cell 10, the air stream under examination comes into contact with an electrically heated metal wire conductor 20 which has been shown in Fig. 1 as supported within cell 10 in the form of a concentric helical coil upon an axially disposed electrical insulating rod 22, preferably of glass. The rod 22 is centered within the cell by means of spiders 23 having radial legs. The conductor 20 is preferably constructed of a plurality of substantially uniform unit lengths of unlike metal thermocouple wire segments 24 and 26 joined end to end to form a plurality of series-connected pairs of alternate hot and cold thermocouple junctions. The ends of the conductor 20 are coupled into an electric heating circuit including lead wires 28 and 30 and a transformer secondary 32. The primary coil of this transformer is energized by a circuit including a potentiometer 33. At each hot junction (Fig. 3) in the multiple thermocouple conductor 20 there is disposed a short length of catalytic metal wire 34, preferably composed of platinum or platinum alloy. The unlike thermocouple wire segments 24 and 26 which together with catalyst sections 34 make up the conductor 20, are preferably base metal alloys such as chromel (10 per cent chromium-nickel alloy) and alumel (2 per cent aluminum, 3 per cent manganese, 1 per cent silicon, and 94 per cent nickel).

The conductor 20 (including the catalytic metal hot junctions 34 and the chromel and alumel thermocouple metal elements 24 and 26) is heated uniformly to a predetermined temperature (which is the operating temperature of the cold junctions) by alternating current in the heating current circuit. Sufficient current is passed through this circuit to maintain the catalyst elements 34 at or above the catalytic combustion temperature of any combustible in the air stream.

Prior to entering the cell 10, the air stream is preheated to substantially the temperature at which the catalyst metal 34 is maintained, by passing the air through a preheating tube 36 at a suitable rate. Heat is supplied to the preheating tube by an electrical resistance heating coil 38 surrounding the tube and supplied with current from an electrical heating circuit 40. By thus preheating the air which is passed through the cell 10 to substantially the temperature at which the catalyst elements 34 are maintained, very little heat is lost by the catalyst elements to the air stream passing through the coil. Provision is also made (coil 16 and circuit 18) for heating the walls of the cell 10 to substantially the normal operating temperature of the catalyst wires 34 in order to minimize loss of heat from the catalyst to the walls of the cell 10.

Chromel and alumel are the preferred metal alloys employed in the construction of the multiple thermocouple conductor 20 because these alloys are stable in air at the operating temperatures of 1000° F.–1600° F. at which the catalysts 34 are operated, and furthermore both chromel and alumel are non-catalysts for combustion reactions, so that they may be safely used in forming the cold junction of a thermocouple having an active catalyst such as platinum at the hot junction. Other kinds of thermocouple metal may of course be used provided that they possess similar properties to those indicated.

By preheating the air and by heating the cell 10 in the manner described, the catalyst elements 34 may be maintained at the proper temperature for catalyzing combustion reactions of any combustible in the air contacted with the catalyst, by applying to the catalyst a relatively small amount of electrical energy, which energy supply can thus more easily be kept normally constant in input rate. Moreover by holding the rate of heat loss from the hot thermocouple junctions 34 within a relatively small amount, the rate of heat developed by combustion at these junctions will create a comparatively high temperature differential between the hot and cold junctions, even though the air contains a relatively small fraction of combustible constituents. Furthermore the increase of heat loss from the junctions 34 as their temperature rises due to combustion of any combustible components coming in contact therewith, will remain comparatively small; with the result that a major fraction of the total combustion heat developed is effective in raising the temperature of the catalyst hot junctions and thereby increasing the temperature differential between the hot and cold junctions.

As illustrated in Figs. 1 and 3, the alternate thermocouple hot junctions in the conductor 20 are preferably constructed by butt-welding to one end of a short length of platinum wire 34 an end of one couple wire 24 of chromel, and by butt-welding to the other end of the catalyst wire 34 the end of an unlike couple wire 26 of alumel. In place of the fine platinum wires 34 the catalyst elements may be constructed in the form of short sections of thin flat ribbon 42 (Figs. 5 and 6) or of thin annular sheet collars 44 (Figs. 4 and 7). The use of a thin catalyst ribbon in place of a fine wire has the advantage of a larger ratio of reactive surface to volume, and relatively less metal to heat. This type of catalyst would thus register a proportionately great temperature increase due to combustion at its surface. Heretofore the use of metal catalysts having a large surface to volume ratio has not been favored, because provision had not been made for compensating for the larger heat losses developed from this type of catalyst as their temperature rises, and prior catalyst requirements were best met by small surface to volume ratios leading to constancy of reference temperature.

By making the short sections of catalyst wire 34 of lesser cross section than the thermocouple wires 24—26, the temperatures at the hot and cold thermocouple junctions may be made to balance during periods when no combustion is taking place in the gas contacted with the hot junctions. This results from the fact that platinum is a better conductor than chromel and alumel, and therefore is heated to a lower temperature than these metals by a definite current flowing through a unit size of metal conductor.

It is not necessary, however, for the satisfactory operation of the gas analyzer of the present invention that the hot and cold junctions be maintained at the same temperature in the absence of combustion at the hot junctions. In other words, it is perfectly feasible to so proportion the size of the platinum wires 34 at the hot junctions, that they will be maintained at a lower temperature than the cold junctions in the absence of combustion, thus developing in the thermocouple a D. C. current creating an initial deflection in a galvanometer 46, which deflection will be reduced or reversed whenever combustion takes place in the gas coming in contact with the catalyst wires 34.

As illustrated in Fig. 1, the preferred analyzer design of the present invention contemplates assembly of the pairs of thermocouple junctions in two groups by connecting the galvanometer 46 by means of a conductor 48 to a center tap in the transformer primary 32 and to a center tap in the heating coil 20. Thus two groups of thermocouples are provided which are connected in parallel through the galvanometer so far as their D. C. current output is concerned, even though they remain connected in series in the A. C. heating circuit. By thus connecting the two groups of thermocouples in parallel through the galvanometer to the center tap of the transformer which is the source of A. C. current, it is possible to balance galvanometer 46 as to A. C. current so that there is no A. C. potential across the galvanometer.

The invention having thus been described, what is claimed as new is:

1. The method of analyzing air for small amounts of combustible which comprises, setting up a flowing stream of said air through a combustion zone, exposing one small portion of said stream to combustion reactions at a catalytically reactive metal surface while simultaneously passing another portion of said stream over a non-catalytic metal surface, preheating both the catalytic and non-catalytic metals to a predetermined temperature, preheating walls surrounding the combustion zone, preheating the air stream to approximately the temperature to which the catalyst and non-catalyst metal surfaces are preheated, and measuring any temperature differential developed between said metal surfaces as a result of combustion on the active surface.

2. The method of analyzing air for small amounts of combustible which comprises, setting up a flowing stream of said air, simultaneously passing electric heating current through non-catalytic wire thermocouple hot and cold junctions disposed at spaced points, contacting the air stream with a cold junction and with a catalyst metal coupled to a hot junction while heating both junctions to a temperature above the ignition temperature of any combustible in the air at the catalyst surface, preheating the air stream to approximately the temperature to which the hot and cold junctions are heated, and measuring any electric potential developed between the hot and cold junctions as a result of an increased temperature at the hot junction arising from catalytic combustion.

3. In employing a plurality of pairs of series-connected thermocouples having hot and cold junctions respectively disposed in spaced relation within a catalytic combustion cell, with a catalyst metal joint at each hot junction, for measuring quantitatively small amounts of combustible gas in admixture with air, the steps comprising, electrically heating said thermocouple junctions to a temperature above the ignition temperature of said gas-air mixture at the catalyst surface, flowing a stream of said gas-air mixture over said hot and cold junctions, applying preheat to the gas-air mixture before introducing it to the cell, applying heat to the cell to prevent substantial loss of heat from the thermocouple junctions, and measuring any electric potential developed between the hot and cold junctions as a result of increased temperatures developed by catalytic combustion at the hot junctions.

4. In gas analyzing apparatus, a thermo-electric pyrometer comprising a pair of hot and cold thermocouple junctions respectively disposed in spaced positions transversely of the path of a flowing stream of gas, a catalyst metal in contact with said hot junction and a non-catalyst metal at the cold junction, means for preheating the gas prior to contact with the hot and cold junctions and an electric heating circuit including both thermocouple junctions.

5. In gas analyzing apparatus, a combustion zone, a thermo-electric pyrometer comprising a plurality of series-connected pairs of thermocouple hot and cold junctions disposed in spaced relation within said zone in the path of gas passing therethrough, a catalyst metal deposit at each hot junction, the thermocouple cold junctions being constructed of non-catalyst metal, means for preheating the gas prior to contact with the hot and cold junctions, and an electric heating circuit including both hot and cold thermocouple junctions.

6. In gas analyzing apparatus, a combustion cell having an inlet for gas and a gas discharge port, a thermoelectric pyrometer comprising a pair of hot and cold thermocouple junctions respectively disposed in spaced positions within said cell transversely of the path of a flowing stream of gas passing therethrough, a catalyst metal in contact with said hot junction and a non-catalyst metal at the cold junction, a device for preheating the combustion cell, means for preheating gas to be analyzed immediately prior to its entrance to the cell, and an electric heating circuit including both thermocouple junctions.

7. In gas analyzing apparatus, a combustion cell having an inlet for gas and a gas discharge port, a thermoelectric pyrometer comprising a plurality of series-connected thermocouple hot and cold junctions disposed in spaced relation within said cell in the path of gas passing therethrough, a catalyst metal deposit at each hot junction, the thermocouple cold junctions being constructed of non-catalyst metal, means for heating the walls of the combustion cell, means for preheating the gas immediately prior to its entrance to the cell, and an electric heating circuit including both hot and cold thermocouple junctions.

8. In gas analyzing apparatus, a thermo-electric pyrometer comprising a plurality of series connected pairs of thermocouple hot and cold junctions disposed in spaced relation in the path of a flowing stream of gas to be analyzed, a catalyst metal deposit at each hot junction, the thermocouple cold junctions being constructed of non-catalyst metal, means for preheating the gas prior to contact with the hot and cold junctions, and an electric heating circuit including a source of A. C. current and including both hot and cold thermocouple junctions.

9. In gas analyzing apparatus, a combustion cell having an inlet for gas and a gas discharge port, a thermo-electric pyrometer comprising a plurality of pairs of the thermocouple hot and cold junctions connected in two groups within said cell in the path of gas passing therethrough, the two groups being connected in series in an electric heating circuit including a source of A. C. heating current and in parallel with reference to a galvanometer for measuring the D. C. output of the thermocouples, and a catalyst metal deposit at each hot junction, the thermocouple cold junctions being constructed of non-catalyst metal.

BENJAMIN MILLER.